US008301121B2

(12) United States Patent
McKee

(10) Patent No.: US 8,301,121 B2
(45) Date of Patent: Oct. 30, 2012

(54) REGULATING ALERTS GENERATED BY COMMUNICATION TERMINALS RESPONSIVE TO SENSED MOVEMENT

(75) Inventor: Matthew McKee, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 315 days.

(21) Appl. No.: 12/692,306

(22) Filed: Jan. 22, 2010

(65) Prior Publication Data

US 2011/0183650 A1 Jul. 28, 2011

(51) Int. Cl.
*H04M 1/725* (2006.01)
(52) U.S. Cl. .................................................. 455/412.2
(58) Field of Classification Search ............... 455/412.1, 455/412.2
See application file for complete search history.

(56) References Cited

U.S. PATENT DOCUMENTS

| | | | |
|---|---|---|---|
| 8,050,665 B1 * | 11/2011 | Orbach | 455/418 |
| 2002/0010008 A1 * | 1/2002 | Bork et al. | 455/567 |
| 2002/0111198 A1 * | 8/2002 | Heie | 455/574 |
| 2002/0137552 A1 * | 9/2002 | Cannon et al. | 455/567 |
| 2005/0258957 A1 * | 11/2005 | Krumm et al. | 340/539.13 |
| 2006/0293037 A1 * | 12/2006 | Signore | 455/417 |
| 2008/0051154 A1 * | 2/2008 | Schlomann et al. | 455/567 |
| 2008/0102783 A1 * | 5/2008 | Bustamante | 455/404.1 |
| 2008/0274728 A1 * | 11/2008 | Anderson et al. | 455/423 |
| 2009/0156172 A1 * | 6/2009 | Chan | 455/412.2 |

FOREIGN PATENT DOCUMENTS

| | | |
|---|---|---|
| EP | 1 906 641 A1 | 4/2008 |
| WO | WO 2009/068986 A1 | 6/2009 |

OTHER PUBLICATIONS

International Search Report and the Written Opinion of the International Searching Authority Corresponding to International Application No. PCT/IB2011/000006; Date of Mailing: Jun. 8, 2011; 12 Pages.

* cited by examiner

*Primary Examiner* — Nathan Mitchell
(74) *Attorney, Agent, or Firm* — Myers Bigel Sibley & Sajovec, P.A.

(57) ABSTRACT

Various computer-implemented methods and associated mobile communication terminals are provided that regulate the generation of user alerts responsive to received messages so that the alerts may be generated/regenerated when the terminal is moved by a user. A mobile communication terminal may include a movement sensing circuit, a RF transceiver circuit, and a computer circuit. The movement sensing circuit may be configured to generate a movement signal indicating movement of the mobile communication terminal. The RF transceiver circuit may be configured to communicate through a wireless air interface. The computer circuit may be configured to respond to receipt of a defined message through the RF transceiver circuit while the movement signal indicates that the terminal has remained stationary for at least a threshold time by setting an alert logic indicator, and configured to respond to sensed movement of the terminal while the alert logic indicator is set by generating a user alert from the terminal to a user.

14 Claims, 4 Drawing Sheets

REGULATING ALERTS GENERATED BY COMMUNICATION TERMINALS RESPONSIVE TO SENSED MOVEMENT

BACKGROUND

The present invention relates to mobile communication terminals and, more particularly, to methods and apparatus that regulate the generation of user alerts from mobile communication terminals.

Conventional mobile communication terminals, such as cellular telephones, vibrate and/or play a defined ring tone to notify a user of an incoming phone call and/or a received text message. If a user is away from the terminal, the vibration and/or ring tone stops after a defined time period so as to, for example, conserve battery power and avoid excessive annoyance to any proximately located persons. Upon returning to the terminal, the user may need to go through a cumbersome process in order to determine whether any incoming calls were missed and/or any text messages have been received, such as by entering a security code through a keypad to unlock the terminal and then identifying the meaning of various diminutive notification symbols that may be displayed.

SUMMARY

Various computer-implemented methods and associated mobile communication mobile terminals are provided that regulate the generation of user alerts responsive to received messages so that the alerts may be generated/regenerated when the terminal is moved by a user.

In accordance with some embodiments, a computer-implemented method of operating a mobile communication terminal to regulate user alerts that are generated therefrom includes operating a computer circuit to respond to receipt of a defined message through a RF transceiver circuit while the terminal has remained stationary for at least a threshold time by setting an alert logic indicator. The computer circuit further responds to sensing movement of the terminal while the alert logic indicator is set by generating a user alert from the terminal to a user.

In some further embodiments, the computer circuit responds to receipt of a defined message through a RF transceiver circuit while the terminal has remained stationary for at least a threshold time by generating a user alert from the terminal to the user through operations performed by the computer circuit, and responds to sensed movement of the terminal while the alert logic indicator is set by generating another user alert from the terminal to the user and resetting the alert logic indicator.

In some further embodiments, the computer circuit further responds to receipt of a defined message through a RF transceiver circuit after the terminal has remained stationary for at least a threshold time by preventing generating of a user alert from the terminal to the user until subsequent movement of the terminal is sensed.

In some further embodiments, the computer circuit further responds to sensed movement of the terminal while the alert logic indicator is set by triggering a vibration device to vibrate the terminal to alert the user in response to sensing movement of the terminal while the alert logic indicator is set.

In some further embodiments, the computer circuit further responds to sensed movement of the terminal while the alert logic indicator is set by triggering a speaker device to generate a defined audible signal to the user in response to sensing movement of the terminal while the alert logic indicator is set.

In some further embodiments, the computer circuit further responds to receipt of a defined message through a RF transceiver circuit while the terminal has remained stationary for less than the threshold time by triggering a vibration device to vibrate the terminal and/or triggering a speaker device to generate a defined audible signal for a first duration as an alert to the user. Furthermore, the computer circuit responds to receipt of a defined message through a RF transceiver circuit while the terminal has remained stationary for at least a threshold time by triggering the vibration device to vibrate the terminal and/or triggering the speaker device to generate a defined audible signal for a second duration, which is greater than the first duration, as an alert to the user.

In some further embodiments, the computer circuit further responds to receipt of a defined message through a RF transceiver circuit while the terminal has remained stationary for less than the threshold time by triggering a speaker device to generate a defined audible signal at a first volume as an alert to the user. Furthermore, the computer circuit responds to receipt of a defined message through a RF transceiver circuit while the terminal has remained stationary for at least a threshold time by triggering the speaker device to generate a defined audible signal at a second volume that is greater than the first volume as an alert to the user.

In some further embodiments, the computer circuit further responds to receipt at the terminal of a text/multimedia message from another communication terminal while the terminal has remained stationary for at least the threshold time by triggering a vibration device to vibrate the terminal and/or triggering a speaker device to generate a defined audible signal as an indication to the user that the message was received and by setting the alert logic indicator. Furthermore, the computer circuit responds to sensed movement of the terminal while the alert logic indicator is set by triggering the vibration device to vibrate the terminal and/or triggering the speaker device to generate a defined audible signal as a repeated alert to the user that the message was received and by resetting the alert logic indicator.

In some further embodiments, the computer circuit further responds to receipt at the terminal of a call paging message from a cellular system while the terminal has remained stationary for at least the threshold time by triggering a vibration device to vibrate the terminal and/or triggering a speaker device to generate a defined audible signal as an indication to the user that the call paging message was received and by setting the alert logic indicator. Furthermore, the computer circuit responds to sensed movement of the terminal while the alert logic indicator is set by triggering the vibration device to vibrate the terminal and/or triggering the speaker device to generate a defined audible signal as a repeated alert to the user that the call paging message was received and resetting the alert logic indicator.

In some further embodiments, the computer circuit further responds to receipt at the terminal of a call paging message for an incoming call from a cellular system while the terminal has remained stationary for less than the threshold time by transferring the incoming call to a voice mailbox, which is associated with the terminal, after a first duration of the call paging message remaining unanswered by a user. Furthermore, the computer circuit responds to receipt at the terminal of the call paging message from the cellular system while the terminal has remained stationary for at least the threshold time by transferring the incoming call to the voice mailbox after a second duration, which is different than the first duration, of the call paging message remaining unanswered by the user.

In some further embodiments, the second duration is greater than the first duration.

In some further embodiments, the computer circuit further responds to sensed movement of the terminal by resetting a timer value of a counter circuit, and determines that the terminal has remained stationary for at least the threshold time in response to the timer value exceeding a defined threshold value.

Some other embodiments of the present invention are directed to a mobile communication terminal that includes a movement sensing circuit, a RF transceiver circuit, and a computer circuit. The movement sensing circuit is configured to generate a movement signal indicating movement of the mobile communication terminal. The RF transceiver circuit is configured to communicate through a wireless air interface. The computer circuit is configured to respond to receipt of a defined message through the RF transceiver circuit while the movement signal indicates that the terminal has remained stationary for at least a threshold time by setting an alert logic indicator, and configured to respond to sensed movement of the terminal while the alert logic indicator is set by generating a user alert from the terminal to a user.

In some further embodiments, the computer circuit is further configured to respond to receipt of the defined messaged through the RF transceiver circuit while the terminal has remained stationary for at least the threshold time by generating a user alert from the terminal to the user, and to respond to sensed movement of the terminal while the alert logic indicator is set by repeating the generation of the user alert to the user.

In some further embodiments, the computer circuit is further configured to respond to receipt of the defined message through the RF transceiver circuit while the terminal has remained stationary for at least the threshold time by preventing generating of a user alert from the terminal to the user until the movement signal subsequently indicates movement of the terminal.

In some further embodiments, the computer circuit is further configured to respond to receipt of the defined message through the RF transceiver circuit while the terminal has remained stationary for less than the threshold time by triggering a vibration device to vibrate the terminal and/or triggering a speaker device to generate a defined audible signal for a first duration as an alert to the user, and configured to respond to receipt of the defined message through the RF transceiver circuit while the terminal has remained stationary for at least the threshold time by setting the alert logic indicator and triggering the vibration device to vibrate the terminal and/or triggering the speaker device to generate a defined audible signal for a second duration, which is greater than the first duration, as an alert to the user.

In some further embodiments, the computer circuit is further configured to respond to receipt of the defined message through the RE transceiver circuit while the terminal has remained stationary for less than the threshold time by triggering a speaker device to generate a defined audible signal at a first volume as an alert to the user, and configured to respond to receipt of the defined message through the RF transceiver circuit while the terminal has remained stationary for at least the threshold time by setting the alert logic indicator and triggering the speaker device to generate a defined audible signal at a second volume that is greater than the first volume as an alert to the user.

In some further embodiments, the computer circuit is further configured to respond to receipt of a text/multimedia message through the RF transceiver circuit while the terminal has remained stationary for at least the threshold time by triggering a vibration device to vibrate the terminal and/or triggering a speaker device to generate a defined audible signal as an indication to the user that the message was received and by setting the alert logic indicator, and configured to respond to sensed movement of the terminal while the alert logic indicator is set by triggering the vibration device to vibrate the terminal and/or triggering the speaker device to generate a defined audible signal as a repeated alert to the user that the message was received and by resetting the alert logic indicator.

In some further embodiments, the computer circuit is further configured to respond to receipt of a call paging message from a cellular system through the RF transceiver circuit while the terminal has remained stationary for at least the threshold time by triggering a vibration device to vibrate the terminal and/or triggering a speaker device to generate a defined audible signal as an indication to the user that the call paging message was received and by setting the alert logic indicator, and configured to respond to sensed movement of the terminal while the alert logic indicator is set by triggering the vibration device to vibrate the terminal and/or triggering the speaker device to generate a defined audible signal as a repeated alert to the user that the call paging message was received and by resetting the alert logic indicator.

In some further embodiments, the computer circuit is further configured to respond to receipt of a call paging message for an incoming call from a cellular system through the RF transceiver circuit while the terminal has remained stationary for less than the threshold time by transferring the incoming call to a voice mailbox, which is associated with the terminal, after expiration of a first duration of the call paging message remaining unanswered by a user, and configured to respond to receipt of the call paging message from the cellular system while the terminal has remained stationary for at least the threshold time by transferring the incoming call to the voice mailbox after expiration of a second duration, which is different than the first duration, of the call paging message remaining unanswered by a user.

Other electronic devices and components according to embodiments of the invention will be or become apparent to one with skill in the art upon review of the following drawings and detailed description. It is intended that all such additional electronic devices and components be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
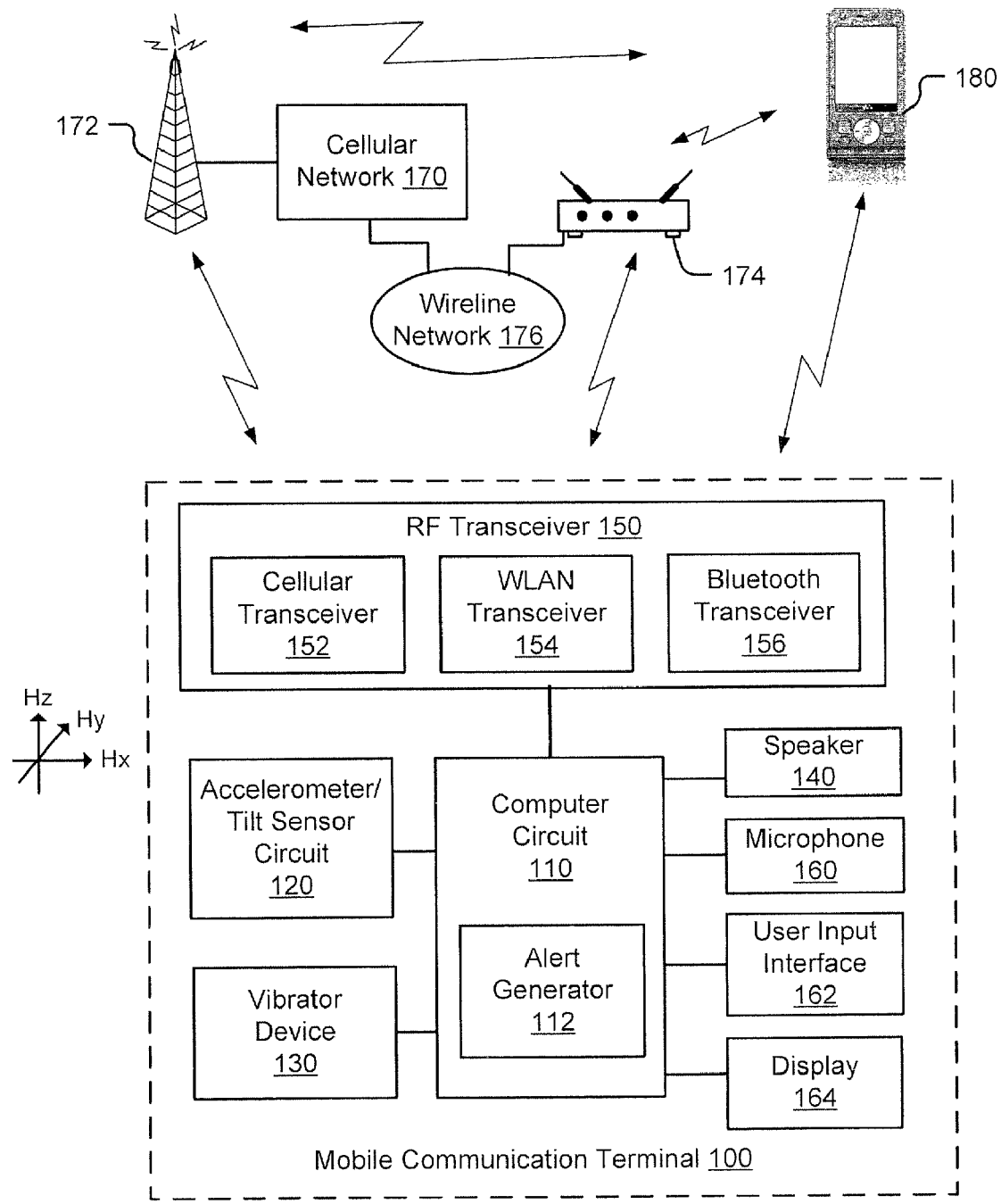
FIG. 1 is a schematic block diagram of an exemplary mobile communication terminal that regulates user alerts that are generated therefrom in response to messages received from other communication devices and responsive to movement of the terminal in accordance with some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Exemplary embodiments are described below with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer-usable or computer-readable medium may be, for example but not limited to, an electronic, magnetic, optical, electromagnetic, or semiconductor data storage system, apparatus, or device. More specific examples (a non-exhaustive list) of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Conventional mobile communication terminals, such as cellular telephones, vibrate and/or play a defined ring tone to notify a user of an incoming phone call and/or a received text message. If a user is away from the terminal, the vibration and/or ring tone stops after a defined time period so as to, for example, conserve battery power and avoid excessive annoyance to any proximately located persons. When the user returns to the terminal, the user may need to go through a cumbersome process in order to determine whether any incoming calls were missed and/or any text messages have been received, such as by entering a security code through a keypad to unlock the terminal and then viewing various diminutive notification symbols that may be displayed.

Various embodiments of the present invention may arise from the present realization that a terminal can be configured to sense when it has remained stationary for a sufficient time that indicates that the terminal has been left unattended by a user (e.g., terminal rests on a table). The terminal can be further configured to generate or regenerate an alert to the user when the terminal subsequently senses movement which indicates that the user has returned to and moved the terminal (e.g., the user is now carrying the terminal). Consequently, when a user picks up a terminal that has been previously left unattended, the terminal will alert the user when an incoming call was missed and/or when text/multimedia message was received during the user's absence. These and other embodiments will be described in further detail below with regard to FIGS. 1-5.

For purposes of illustration and explanation only, various embodiments of the present invention are described herein in the context of mobile communication terminals ("wireless terminals" or "terminals") that are configured to communicate through a cellular communication interface (e.g., cellular voice and/or data communications) and to communicate through a wireless local area network (WLAN) interface and Bluetooth wireless interface, and which is further configured to alert a user through a vibrator device and a speaker. It will be understood, however, that the present invention is not limited to such embodiments and may be embodied generally in any mobile communication terminal that is configured to generate at least one type of user alert (e.g., vibration alert and/or audible alert) in response to receipt of at least one type of defined message (e.g., call paging message and/or text/multimedia message).

FIG. 1 is a schematic block diagram of an exemplary mobile communication terminal 100 that regulates user alerts that are generated therefrom in response to messages that are received from other communication devices and responsive to movement of the terminal 100 in accordance with some embodiments of the present invention. Referring to FIG. 1, the terminal 100 includes a computer circuit 110, a movement sensing circuit 120 (illustrated as an accelerometer/tilt sensor circuit), a vibration device 130, a speaker device 140, a RF transceiver circuit 150, and may further include a microphone 160, a user input interface 162, and a display device 164. The computer circuit 110 may include a general purpose processor circuit and/or a digital signal processor circuit which can execute instructions from a computer readable memory, which may reside therein or may be connected thereto, to perform at least some of the operations and methods described herein.

The RF transceiver 150 may include a cellular transceiver 152 that is configured to communicative through a base station 172 with a cellular network 170. The RF transceiver 150 may alternatively or additionally include a WLAN transceiver 154 that is configured to communicative with a WLAN router 174. The cellular network 170 and/or the WLAN router 174 may be connected to a wireline network 176 (e.g., a private network and/or the Internet or another public network). The RF transceiver 150 may alternatively or additionally include a Bluetooth transceiver 156 that connects the terminal 100 through an ad hoc network to another mobile communication terminal 180.

The cellular transceiver 152 can be configured to encode/decode and transmit and receive RF communications according to one or more cellular protocols, which may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), WiMAX, and/or Long Term Evolution (LTE).

The computer circuit 110 includes an alert generator 112 that is configured to trigger the vibration device 130 to vibrate the terminal and/or to trigger the speaker 140 to generate an audible signal (e.g. play a ring tone) in response to the terminal 100 receiving a message, such as a call paging message and/or a text/multimedia message, through the cellular transceiver 152, the WLAN transceiver 154, the Bluetooth transceiver 156, and/or another component of the RF transceiver 150. The accelerometer/tilt sensor circuit 120 is configured to generate a signal that indicates when the terminal 100 is being moved by a user. The sensor circuit 120 may use an accelerometer (e.g., a single or multi-axis accelerometer (Hx, Hy, Hz)) to generate a signal that indicates acceleration of the terminal 100 and/or may use a tilt sensor that generates a signal which indicates when a tilt angle of the terminal 100 has changed more than a threshold amount. In accordance with some further embodiments, the alert generator 112 is configured to sense when the terminal 100 has remained stationary for at least a threshold time, indicating that it has likely been left unattended by a user, and, responsive thereto, to then subsequently generate or regenerate an alert to a user when the sensor circuit 120 indicates that the terminal 100 is again being moved by the user.

Figure 2:
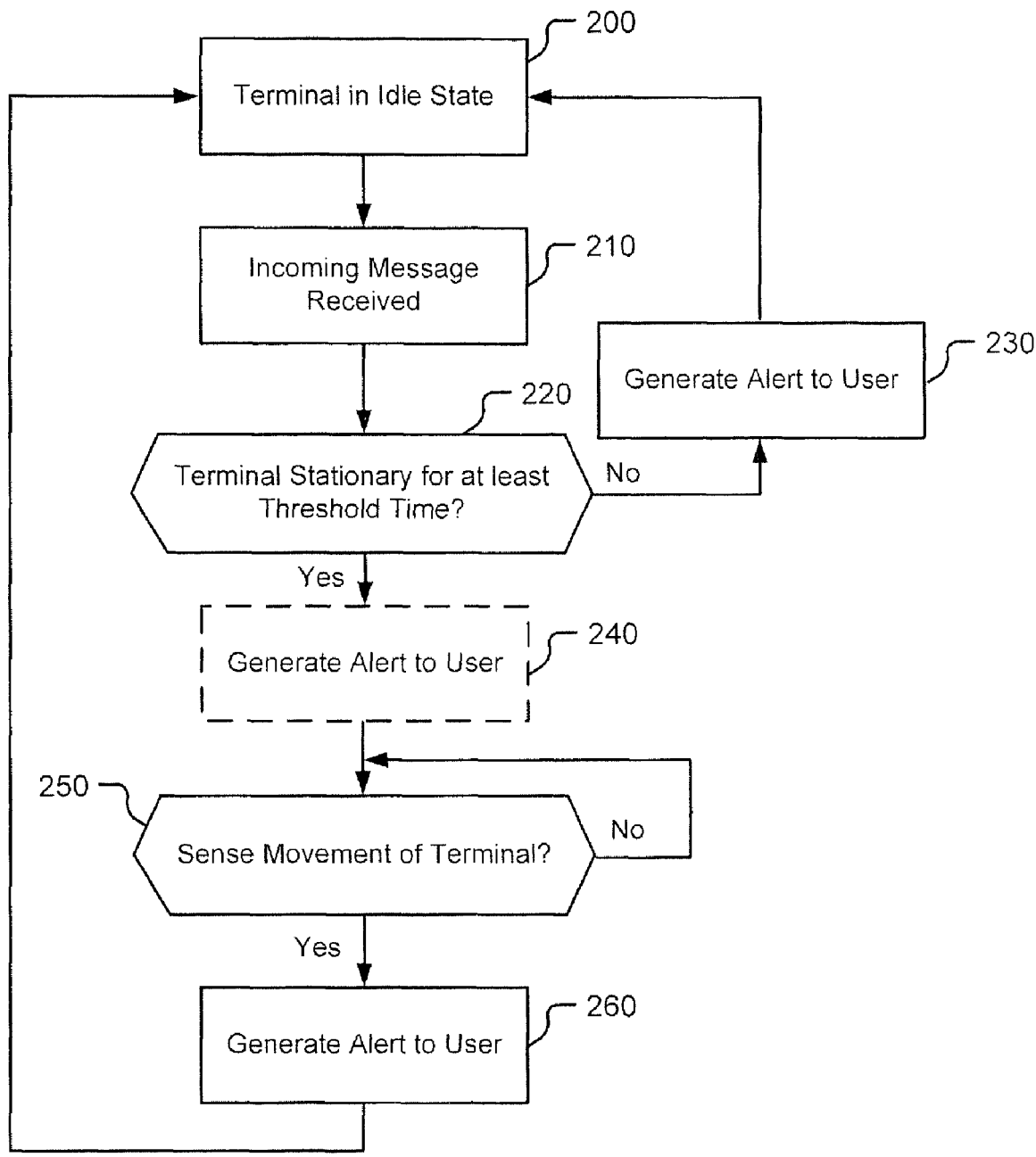
FIG. 2 is a flowchart of operations and methods that may be at least partially carried out by the terminal of FIG. 1 to regulate alerts that are generated therefrom in accordance with some embodiments of the present invention.

FIG. 2 is a flowchart of operations and methods that may be at least partially performed by the computer circuit 110 and, more particularly, by the alert generator 112 to regulate alerts that are generated by the terminal 100 in accordance with some embodiments of the present invention. Referring to FIG. 2, the terminal 100 may initially be in an idle state (block 200) when an incoming message (e.g., call paging message and/or a text/multimedia message) is received (block 210) via the RF transceiver 150. The alert generator 112 determines (block 220) from a movement indication signal from the sensor circuit 120 whether the terminal 100 has remained stationary for at least a threshold time.

When the terminal 100 is determined (block 220) to have remained stationary for less than the threshold time, the alert generator 112 generates a user alert (block 230), such as by triggering the vibration device 130 to vibrate the terminal 100 and/or by triggering the speaker 140 to generate a defined audible signal. The user may then operate the user input interface 162 to silence the alert and to answer the incoming call and/or to view the received text/multimedia message. In contrast, when the terminal 100 is determined (block 220) to have remained stationary for the threshold time, the alert generator 112 may generate (block 240) a user alert in the manner described above with regard to block 230 and then wait (block 250) for the movement indication signal from the sensor circuit 120 to indicate that the terminal has again moved before proceeding to generate (block 260) another alert, such as in the manner described for block 230, that notifies the user of the earlier missed call and/or received message.

Accordingly, when a user picks up the terminal 100 after having left it unattended and motionless, the terminal 100 will automatically alert the user that an incoming call was missed and/or that an text/multimedia message was received during the user's absence. As explained above, an initial user alert may be generated irrespective of whether the terminal 100 has remained stationary for the threshold time, and then the earlier user alert is repeated or a different user alert is generated in response to the terminal 100 subsequently being moved by the user. Alternatively, the operations shown in block 240 may be omitted (e.g. as indicated by the dashed lines) so that, when the terminal 100 has remained stationary for at least the threshold time, an initial alert to the user is not generated until subsequent movement of the terminal 100 is detected.

Figure 3:
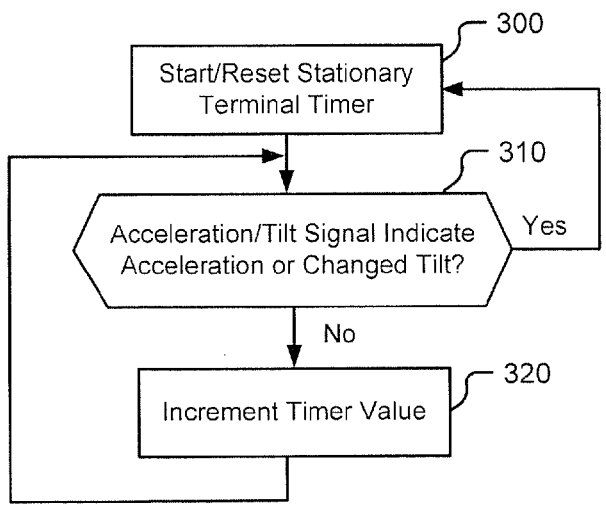
FIG. 3 is a flowchart of operations and methods that may be carried out by the terminal of FIG. 1 to determine when the terminal is stationary in accordance with some embodiments of the present invention.

FIG. 3 is a flowchart of operations and methods that may be carried out by the computer circuit 110 and, more particularly, by the alert generator 112 to determine when the terminal is stationary in accordance with some embodiments of the present invention. Referring to FIG. 3, the alert generator 112 starts/resets (block 300) a stationary terminal timer circuit (e.g., a clock or counter circuit). The alert generator 112 detects and responds (block 310) to the movement indication signal from the sensor circuit 120 indicating that the terminal 100 has accelerated at least a threshold amount and/or has been tilted at least a threshold amount by looping back to trigger resetting of the stationary terminal timer to a default value. Accordingly, each time the sensor circuit 120 detects movement of the terminal 100 in a defined manner, the stationary terminal timer is reset. When the terminal 100 has not been accelerated or tilted a threshold amount, the stationary terminal timer value is incremented (block 320) and the operations loop back to repeat the conditional branching of block 310 responsive to the movement indication signal. Accordingly, the stationary terminal timer continues to be incremented until a maximum allowable value is reached or until it is reset responsive to the terminal 100 being accelerated at least a threshold amount and/or being tilted at least a threshold amount.

Figure 4:
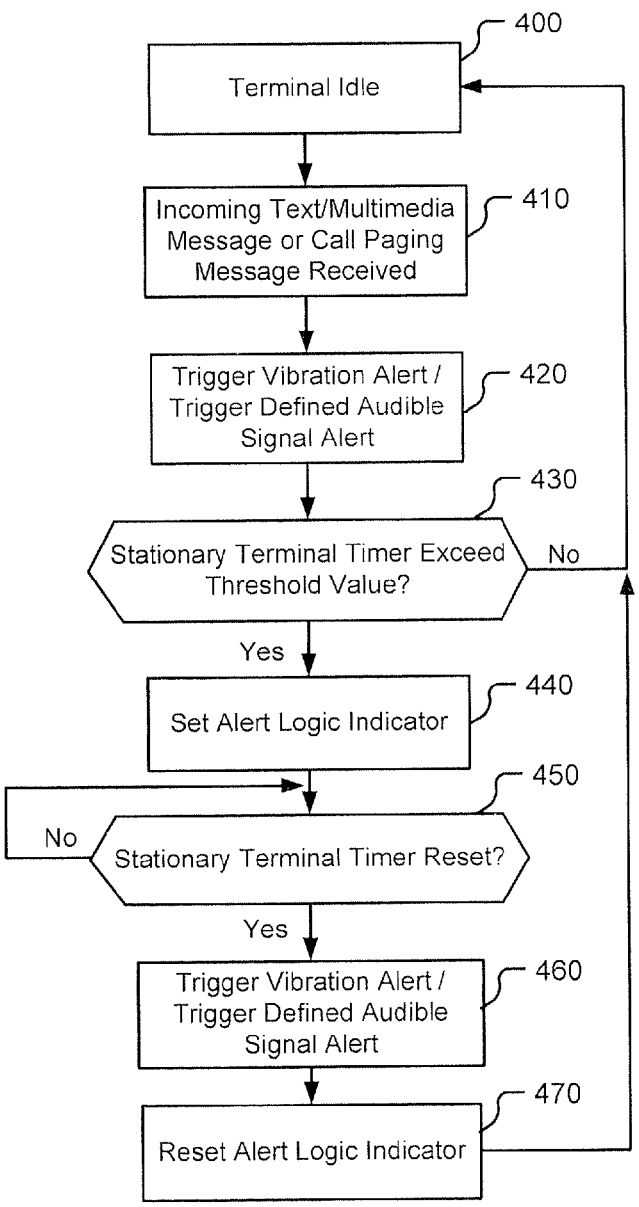
FIG. 4 is a flowchart of operations and methods that may be carried out by the terminal of FIG. 1 to respond to receipt of incoming text/multimedia messages and/or call paging messages in accordance with some embodiments of the present invention.

FIG. 4 is a flowchart of operations and methods that may be carried out by the computer circuit 110 and, more particularly, by the alert generator 112 in combination with the operations and methods of FIG. 3 to respond to receipt of incoming text/multimedia messages and/or call paging messages in accordance with some embodiments of the present invention. Referring to FIG. 4, the terminal 100 may initially be in an idle state (block 400) when an incoming text/multimedia message and/or call paging message for an incoming call is received (block 410). The alert generator 112 generates a user alert (block 420) by triggering the vibration device 130 to vibrate the terminal 100 and/or by triggering the speaker 140 to generate a defined audible signal. A decision is made (block 430) whether the terminal 100 has remained stationary for at least a threshold time (e.g., does the timer value of FIG. 3 exceeds a threshold value), and, if not, the computer circuit 110 may return the terminal 100 to the idle state (block 400) to receive a user command to view the received message and/or to answer the incoming call.

When the terminal 100 has remained stationary for at least the threshold time, an alert logic indicator is set (block 440) to a defined value (e.g., "1"). The alert generator 112 then waits (block 450) for an indication that the terminal 100 has been moved, which can be indicated by the stationary terminal timer being reset. The alert generator 112 then notifies the user of the earlier missed call and/or received message by generating (block 460) another user alert, which may be the same as the alert generated in block 420 and/or may be different therefrom. The alert generator 112 resets (block 470) the alert logic indicator to another defined value (e.g., "0") and returns the terminal 100 to the idle state (block 400) to receive a user command to view the received message and/or to view details of the earlier missed call.

Figure 5:
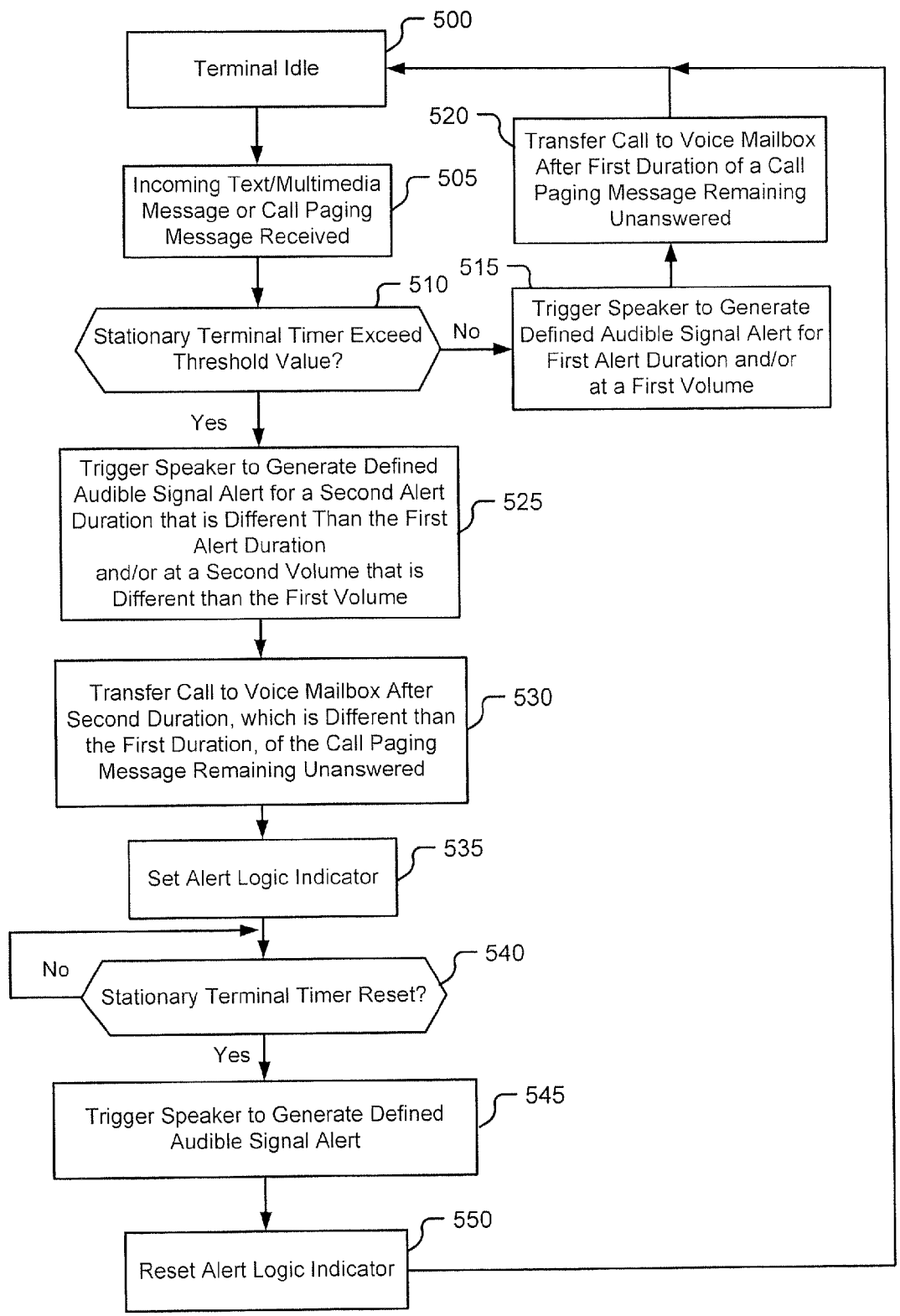
FIG. 5 is flowchart of operations and methods that may be carried out by the terminal of FIG. 1 to respond to receipt of incoming text/multimedia messages and/or call paging messages in accordance with some other embodiments of the present invention.

FIG. 5 is a flowchart of operations and methods that may be carried out by the computer circuit 110 and, more particularly, by the alert generator 112 in combination with the operations and methods of FIG. 3 to respond to receipt of incoming text/multimedia messages and/or call paging messages in accordance with some other embodiments of the present invention. Referring to FIG. 5, the terminal 100 may initially be in an idle state (block 500) when an incoming text/multimedia message and/or call paging message for an incoming call is received (block 505). A decision is made (block 510) whether the terminal 100 has remained stationary for at least a threshold time (e.g., does the timer value of FIG. 3 exceed a threshold value). If not, the alert generator 112 generates a user alert (block 515) by triggering the speaker 140 to generate a defined audible signal for a first alert duration and/or at a first volume level. The alert generator 112 then transfers (block 520) the incoming call to a voice mailbox that is associated with the terminal 100 after a first duration of the call paging message remaining unanswered by the user.

When the terminal 100 has remained stationary for at least the threshold time, the alert generator 112 generates a user alert (block 525) by triggering the speaker 140 to generate a defined audible signal for a second alert duration, which is different than the first alert duration, and/or at a second volume level that is different than the first volume level. In some embodiments, the second alert duration is defined to be longer than the first alert duration and/or the second volume is defined to be greater (louder) than the first volume to increase the likelihood that a user who has left the terminal 100 unattended will hear and respond to the alert. Thus, a ring tone may be played for a longer duration and/or at a greater volume in response to the terminal 100 determining that it has not been moved for at least the threshold time. In some other embodiments, the second alert duration is defined to be shorter than the first alert duration and/or the second volume is defined to be less than (quieter) than the first volume to reduce potential annoyance to other users who may be within audible range of the unattended terminal 100.

The alert generator 112 may transfer (block 530) the incoming call to the voice mailbox after a second duration, which is different than the first duration, of the call paging message remaining unanswered by the user. In some embodiments, the second duration is defined to be longer than the first duration to allow more time for the user to return to the unattended terminal 100 and answer the incoming call. Thus, a ring tone may be played for a longer duration before the call is transferred to voice mail in response to the terminal 100 determining that it has not been moved in at least a threshold time. The terminal 100 may, for example, transmit a message to the cellular network 170 that indicates that the terminal 100 is stationary (likely unattended), which may cause the cellular network 170 to transfer an incoming call less quickly to voice mail to allow a user more time to return to the terminal 100 and answer an incoming call. In some other embodiments the second duration is defined to be shorter than the first duration to reduce potential audible annoyance to other users who may be within audible range of the unattended terminal 100. Accordingly, the cellular network 170 may be configured to respond to a message received from the terminal 100 that indicates the terminal's stationary status by transferring an incoming call for that terminal more quickly to voice mail than occurs in the absence of such notification.

The alert generator 112 sets (block 535) an alert logic indicator to a defined value (e.g., "1"), and then waits (block 540) for an indication that the terminal 100 has been moved, which can be indicated by the stationary terminal timer being reset to another defined value (e.g., "0"). The alert generator 112 then triggers (block 545) the speaker to generate an audible signal that notifies the user of the earlier missed call and/or received message. The audible signal generated at block 545 may be the same as that generated at block 515 or 525, or it may be different therefrom. The alert generator 112 resets (block 550) the alert logic indicator to another defined value (e.g., "0") and returns the terminal 100 to the idle state (block 500).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A computer-implemented method of operating a mobile communication terminal to regulate user alerts that are generated therefrom, the computer-implemented method comprising:

responding to receipt of a defined message through a RF transceiver circuit while the terminal has remained stationary for at least a threshold time by setting an alert logic indicator through operations performed by the computer circuit;

responding to sensed movement of the terminal while the alert logic indicator is set by generating a user alert from the terminal to a user through operations performed by the computer circuit; and responding to receipt at the terminal of a call paging message for an incoming call from a cellular system while the terminal has remained stationary for less than the threshold time by transferring the incoming call to is voice mailbox, which is associated with the terminal, after a first duration of the call paging message remaining unanswered by a user, wherein responding to receipt of a defined message through a RF transceiver circuit while the terminal has remained stationary for at least a threshold time by setting an alert logic indicator comprises responding to receipt at the terminal of the call paging message from the cellular system while the terminal has remained stationary for at least the threshold time by transferring the incoming call to the voice mailbox after a second duration, which is different than the first duration, of the call paging message remaining unanswered by the user.

2. The method of claim 1, wherein
responding to receipt of a defined message through a RF transceiver circuit while the terminal has remained stationary for at least a threshold time by setting an alert logic indicator further comprises generating a user alert from the terminal to the user through operations performed by the computer circuit; and responding to sensed movement of the terminal while the alert logic indicator is set by generating a user alert from the terminal to a user comprises generating another user alert from the terminal to the user and resetting the alert logic indicator.

3. The method of claim 1, wherein;
responding to receipt of a defined message through a RF transceiver circuit after the terminal has remained stationary for at least a threshold time by setting an alert logic indicator further comprises preventing generating of a user alert from the terminal to the user until subsequent movement of the terminal is sensed.

4. The computer-implemented method of claim 1, wherein responding to sensed movement of the terminal while the alert logic indicator is set by generating a user alert from the terminal to a user comprises:
triggering a vibration device to vibrate the terminal to alert the user in response to sensing, movement of the terminal while the alert logic indicator is set.

5. The computer-implemented method of claim 1, wherein responding to sensed movement of the terminal while the alert logic indicator is set by generating a user alert from the terminal to a riser comprises:
triggering a speaker device to generate a defined audible signal to the user in response to sensing movement of the terminal while the alert logic indicator is set.

6. The computer implemented method of claim 1, wherein:
responding to receipt of a defined message through a RF transceiver circuit while the terminal has remained stationary for at least a threshold time by setting an alert logic indicator comprises responding to receipt at the terminal of a text/multimedia message from another communication terminal while the terminal has remained stationary for at least the threshold time by triggering a vibration device to vibrate the terminal and/or triggering a speaker devise to generate a defined audible signal as an indication to the user that the message was received and by setting the alert logic indicator; and responding to sensed movement of the terminal while the alert logic indicator is set by generating a user alert from the terminal to a user comprises triggering the vibration device to vibrate the terminal and/or triggering the speaker devise to generate a defined audible signal as a repeated alert to the user that the message was received and resetting the alert logic indicator.

7. The computer-implemented method of claim 1, wherein:
responding to receipt of a defined message through a RF transceiver circuit while the terminal has remained stationary for at least a threshold time by setting an alert logic indicator comprises responding to receipt at the terminal of a cell paging message from a cellular system while the terminal has remained stationary for at least the threshold time by triggering a vibration devise to vibrate the terminal and/or triggering a speaker device to generate a defined audible signal as an indication to the user that the call paging message was received and by setting the alert logic indicator; and responding to sensed movement of the terminal while the alert logic indicator is set by generating a user alert from the terminal to a user comprises triggering the vibration device to vibrate the terminal and/or triggering the speaker device to generate a defined audible signal as a repeated alert to the user that the call paging message was received and resetting the alert logic indicator.

8. The computer-implemented method of claim 1, wherein the second duration is greater than the first duration.

9. The computer-implemented method of claim 1, wherein responding to receipt or a defined message through a RF transceiver circuit while the terminal has remained stationary for at least a threshold time by setting an alert logic indicator comprises:
resetting a timer value of a counter circuit responsive to sensed movement of the terminal; and
determining that the terminal has remained stationary for at least the threshold time in response to the timer value exceeding a defined threshold value.

10. A mobile communication terminal comprising:
a movement sensing circuit that is configured to generate a movement signal indicating movement of the mobile communication terminal;
a RF transceiver circuit that is configured to communicate through a wireless air interface; and
a computer circuit that is configured to respond to receipt of a defined message through the RF transceiver circuit while the movement signal indicates that the terminal has remained stationary for at least a threshold time by setting an alert logic indicator, and configured to respond to sensed movement of the terminal while the alert logic indicator is set by generating a user alert from the terminal to a user,
wherein the computer circuit is further configured to respond to receipt of a call paging message for an incoming call from a cellular system through the RF transceiver circuit while the terminal has remained stationary for less than the threshold time by transferring the incoming call to a voice mailbox, which is associated with the terminal, after expiration of a first duration of the call paging message remaining unanswered by a user, and configured to respond to receipt of the call paging message from the cellular system while the terminal has remained stationary for at least the threshold time by transferring the incoming call to the voice mailbox after expiration of a second duration, which is different than the first duration, of the call paging message remaining unanswered by a user.

11. The mobile communication terminal of claim 10, wherein:

the computer circuit is further configured to respond to receipt of the defined messaged through the RF transceiver circuit while the terminal has remained stationary for at least the threshold time by generating a user alert from the terminal to the user, and to respond to sensed movement of the terminal while the alert logic indicator is set by repeating the generation of the user alert to the user.

12. The mobile communication terminal of claim 10, wherein:

the computer circuit is further configured to respond to receipt of the defined message through the RF transceiver circuit while the terminal has remained stationary for at least the threshold time by preventing generating of a alert from the terminal to the user until the movement signal subsequently indicates movement of the terminal.

13. The mobile communication terminal of claim 10, wherein:

the computer circuit is further configured to respond to receipt of a text/multimedia message through the RF transceiver circuit while the terminal has remained stationary for at least the threshold time by triggering a vibration device to vibrate the terminal and/or triggering a speaker device to generate a defined audible signal as an indication to the user that the message was received and by setting the alert logic indicator, and configured to respond to sensed movement of the terminal while the alert logic indicator is set by triggering the vibration device to vibrate the terminal and/or triggering the speaker device to generate a defined audible signal as a repeated alert to the user that the message was received and by resetting the alert logic indicator.

14. The mobile communication terminal of claim 10, wherein:

the computer circuit is further configured to respond to receipt of a call paging message from a cellular system through the RF transceiver circuit while the terminal has remained stationary for at least the threshold time by triggering a vibration device to vibrate the terminal and/or triggering a speaker device to generate a defined audible signal as an indication to the user that the call paging message was received and by setting the alert logic indicator, and configured to respond to sensed movement of the terminal while the alert logic indicator is set by triggering the vibration device to vibrate the terminal and/or triggering the speaker device to generate a defined audible signal as a repeated alert to the user that the call paging message was received and by resetting the alert logic indicator.

* * * * *

UNITED STATES PATENT AND TRADEMARK OFFICE
CERTIFICATE OF CORRECTION

PATENT NO. : 8,301,121 B2  Page 1 of 1
APPLICATION NO. : 12/692306
DATED : October 30, 2012
INVENTOR(S) : McKee It is certified that error appears in the above-identified patent and that said Letters Patent is hereby corrected as shown below:

In the Claims:
Column 11, Claim 1, Line 13: Please correct "call to is" to read -- call to a --

Column 11, Claim 2, Line 27: Please correct "The method of claim 1, wherein"
        to read -- The method of claim 1, wherein: --

Column 11, Claim 3, Line 39: Please correct "The method of claim 1, wherein;"
        to read -- The method of claim 1, wherein: --

Column 11, Claim 4, Line 51: Please correct "response to sensing, movement"
        to read -- response to sensing movement --

Column 11, Claim 5, Line 56: Please correct "to a riser comprises:"
        to read -- to a user comprises: --

Column 12, Claim 6, Line 2: Please correct "speaker devise"
        to read -- speaker device --
    Line 10: Please correct "speaker devise"
        to read -- speaker device --

Column 12, Claim 7, Line 18: Please correct "cell paging" to read -- call paging --
    Line 20: Please correct "vibration devise"
        to read -- vibration device --

Column 13, Claim 12, Line 23: Please correct "of a alert" to read -- of a user alert --

Signed and Sealed this
Twenty-eighth Day of May, 2013

Teresa Stanek Rea
*Acting Director of the United States Patent and Trademark Office*